(12) United States Patent
Chiang et al.

(10) Patent No.: US 11,134,421 B2
(45) Date of Patent: Sep. 28, 2021

(54) BASE STATION AND ADJUSTMENT METHOD FOR DATA TRANSMISSION

(71) Applicant: Sercomm Corporation, Taipei (TW)

(72) Inventors: Kun-Lin Chiang, Taipei (TW); Ching-Feng Liang, Taipei (TW)

(73) Assignee: Sercomm Corporation, Taipei (TW)

( * ) Notice: Subject to any disclaimer, the term of this patent is extended or adjusted under 35 U.S.C. 154(b) by 164 days.

(21) Appl. No.: 16/579,887

(22) Filed: Sep. 24, 2019

(65) Prior Publication Data

US 2021/0068011 A1 Mar. 4, 2021

(30) Foreign Application Priority Data

Sep. 3, 2019 (TW) ................... 108131652

(51) Int. Cl.
| | |
|---|---|
| *H04W 4/00* | (2018.01) |
| *H04W 36/00* | (2009.01) |
| *H04W 76/15* | (2018.01) |
| *H04W 16/10* | (2009.01) |
| *H04W 72/08* | (2009.01) |
| *H04W 16/14* | (2009.01) |

(52) U.S. Cl.
CPC ....... *H04W 36/0069* (2018.08); *H04W 16/10* (2013.01); *H04W 16/14* (2013.01); *H04W 72/085* (2013.01); *H04W 76/15* (2018.02)

(58) Field of Classification Search
CPC .. H04W 28/08; H04W 36/0069; H04W 16/10
See application file for complete search history.

(56) References Cited

U.S. PATENT DOCUMENTS

| | | |
|---|---|---|
| 2014/0362829 A1 | 12/2014 | Kazmi et al. |
| 2015/0085800 A1 | 3/2015 | Sivanesan et al. |
| 2016/0157293 A1 | 6/2016 | Pazhyannur et al. |
| | (Continued) | |

FOREIGN PATENT DOCUMENTS

| | | |
|---|---|---|
| CN | 105493555 | 4/2016 |
| CN | 106063330 | 10/2016 |
| | (Continued) | |

OTHER PUBLICATIONS

"Office Action of Taiwan Counterpart Application", dated Mar. 27, 2020, p. 1-p. 11.

*Primary Examiner* — Bo Hui A Zhu
(74) *Attorney, Agent, or Firm* — JCIPRNET

(57) ABSTRACT

A base station and an adjustment method for data transmission are provided. User equipment is selectively connected to two base stations at the same time. In the method, a remaining load amount is determined. A load demand amount required for a to-be-transmitted data bearer in the data bearer is determined. It is determined that a portion of the data packets corresponding to the to-be-transmitted data bearer is split, according to a comparison result between the remaining load amount and the load demand amount, to the second base station for transmission. A transmission ratio of the data packets split to the base station to those split to the second base station is determined according to a ratio of packet loss of the base station to the second base station. Accordingly, electric power of the user equipment can be saved, data loss can be reduced, and data can be converged effectively.

10 Claims, 7 Drawing Sheets

(56) References Cited

U.S. PATENT DOCUMENTS

| | | | |
|---|---|---|---|
| 2016/0212790 A1 | 7/2016 | Fujishiro et al. | |
| 2016/0262149 A1 | 9/2016 | Futaki et al. | |
| 2018/0115921 A1* | 4/2018 | Chen | H04W 28/12 |
| 2018/0176974 A1 | 6/2018 | Fujishiro et al. | |
| 2018/0255545 A1 | 9/2018 | Futaki et al. | |
| 2019/0320339 A1* | 10/2019 | Laselva | H04W 28/0221 |
| 2020/0205213 A1* | 6/2020 | Marco | H04W 76/15 |

FOREIGN PATENT DOCUMENTS

| | | |
|---|---|---|
| CN | 106105304 | 11/2016 |
| WO | 2015027719 | 3/2015 |
| WO | 2019071528 | 4/2019 |

* cited by examiner

BASE STATION AND ADJUSTMENT METHOD FOR DATA TRANSMISSION

CROSS-REFERENCE TO RELATED APPLICATION

This application claims the priority benefit of Taiwan application serial no. 108131652, filed on Sep. 3, 2019. The entirety of the above-mentioned patent application is hereby incorporated by reference herein and made a part of this specification.

BACKGROUND

1. Technical Field

The disclosure relates to a communication transmission mechanism, and in particular, to a base station and an adjustment method for data transmission.

2. Description of Related Art

In provisioning of the new generation of 4G/5G mobile communication networks, provisioning of a macro base station (macro cell) and a small base station (small cell) in a heterogeneous network helps telecom operators upgrade coverage and capacity of provided mobile communication networks. In the early stage of discussion of the 5G new radio (NR), a 4G/5G dual-connection network architecture in a non-standalone (NSA) evolved universal terrestrial radio access-dual connectivity (EUTRA-NR Dual Connectivity (EN-DC) is proposed, which is quite suitable for provisioning of the macro base station and the small base station in the heterogeneous network. The heterogeneous network is constituted through a widely provided long term evolution (LTE) macro base station and a newly provided 5G small base station, and a problem of handover of the heterogeneous network is resolved using a dual-connection network technology, so that a transmission speed of user equipment with a high-frequency bandwidth transmission requirement may be increased.

SUMMARY

Embodiments of the disclosure provide a base station and an adjustment method for data transmission, dynamically activating a split bearer and adjusting a distribution ratio of data between two base stations.

The adjustment method for data transmission according to the embodiments of the disclosure is adapted for a first base station, and user equipment is selectively connected to the first base station and a second base station at the same time. The adjustment method includes the following: determining a remaining load amount, the remaining load amount being a residual capacity used for a data bearer to store data packets; and determining a load demand amount required for a to-be-transmitted data bearer in the data bearer, the load demand amount being a capacity required for several data packets corresponding to the to-be-transmitted data bearer. It is determined that a portion of the data packets corresponding to the to-be-transmitted data bearer is split to the second base station for transmission according to a comparison result between the remaining load amount and the load demand amount.

In addition, a base station according to the embodiments of the disclosure includes an inter-base-station transmission interface and a processor. User equipment is selectively connected to the base station and a second base station at the same time. The inter-base-station transmission interface is configured to communicate with the second base station. A processor is coupled to the inter-base-station transmission interface and is configured to perform the following: determining a remaining load amount, the remaining load amount being a residual capacity used for a data bearer to store data packets; determining a load demand amount required for a to-be-transmitted data bearer in the data bearer, the load demand amount being a capacity required for several data packets corresponding to the to-be-transmitted data bearer; determining, according to a comparison result between the remaining load amount and the load demand amount, that a portion of the data packets corresponding to the to-be-transmitted data bearer is split to the second base station for transmission through the inter-base-station transmission interface.

Based on the foregoing, in the base station and the adjustment method for data transmission according to the embodiment of the disclosure, the remaining load amount and the load demand amount are compared, and it is determined, according to the comparison result, whether to activate or deactivate splitting of data bearer. Accordingly, the user equipment does not need to monitor data transmission of the two base stations. In addition, when the split bearer is being operated, a data distribution ratio of the split bearer can be dynamically adjusted, so that data loss is not caused because a packet is not processed timely for being out-of-order when being converged at a convergence end.

In order to make the aforementioned and other objectives and advantages of the disclosure comprehensible, embodiments accompanied with figures are described in detail below.

DESCRIPTION OF THE EMBODIMENTS

Figure 1:
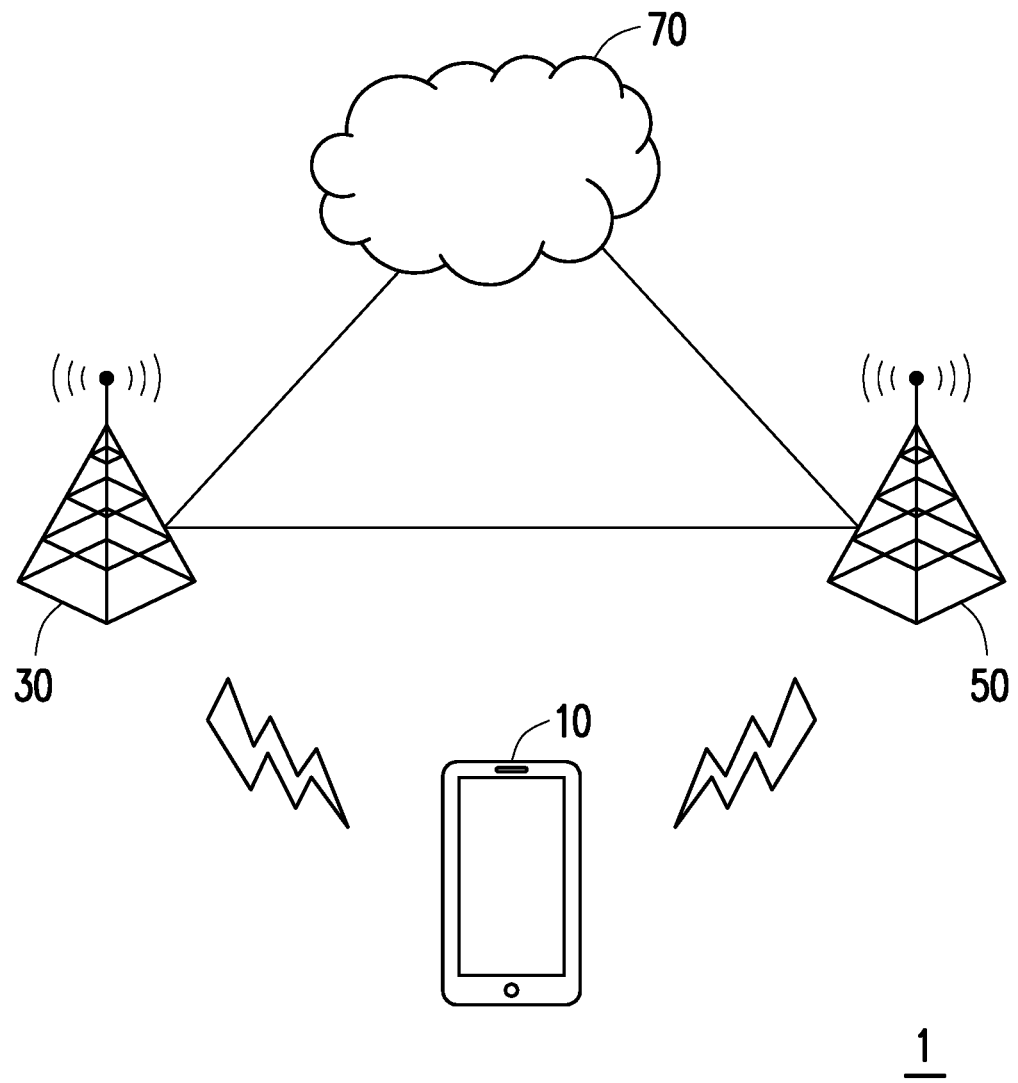
FIG. 1 is a schematic diagram of a communication system according to an embodiment of the disclosure.

FIG. 1 is a schematic diagram of a communication system 1 according to an embodiment of the disclosure. Referring to FIG. 1, the communication system 1 includes but is not only limited to one or more user equipment 10, base stations 30, 50, and a core network 70.

The user equipment 10 may be an apparatus such as a mobile station, an advanced mobile station (AMS), a telephone apparatus, customer premise equipment (CPE), or a wireless sensor, etc.

The base stations 30, 50 may be a home evolved NodeB (HeNB), an eNB, a next generation NodeB (gNB), a base transceiver system (BTS), a relay, or a repeater. It should be noted that in the embodiment of the disclosure, it is not limited whether a category of the two base stations 30, 50 or a standard for supporting the mobile communication is the same.

Figure 2:
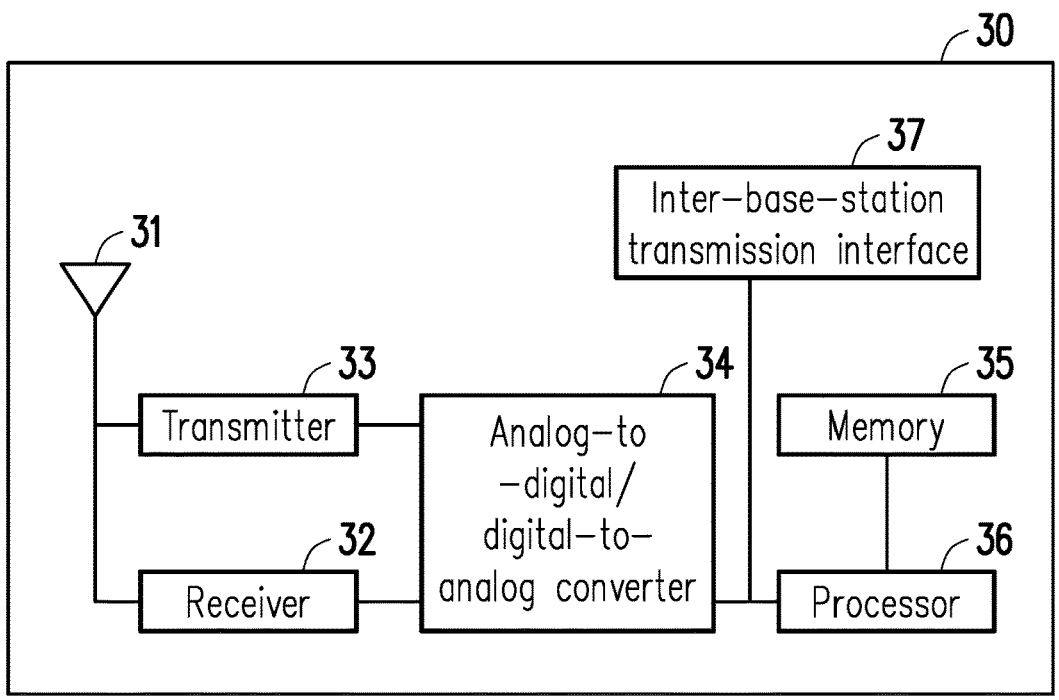
FIG. 2 is a block diagram of elements of a base station according to an embodiment of the disclosure.

FIG. 2 is a block diagram of elements of a base station 30 according to an embodiment of the disclosure. Referring to FIG. 2, the base station 30 includes but is not only limited to one or more antennas 31, a receiver 32, a transmitter 33, an analog-to-digital (A/D)/a digital-to-analog (D/A) converter 34, a memory 35, a processor 36, and an inter-base-station transmission interface 37.

The receiver 32 and the transmitter 33 are respectively configured to wirelessly receive an uplink signal and transmit a downlink signal through the antenna 31. The receiver 32 and the transmitter 33 may also perform analog signal processing operations such as low noise amplification, impedance matching, frequency mixing, up-conversion or down-conversion, filtering, amplification, and the like. The analog-to-digital/digital-to-analog converter 34 is coupled to the receiver 32 and the transmitter 33, and the analog-to-digital/digital-to-analog converter 34 is configured to convert from an analog signal format to a digital signal format during processing of the uplink signal, and convert from the digital signal format to the analog signal format during processing of the downlink signal.

The memory 35 may be any type of fixed or removable random access memory (RAM), a read-only memory (ROM), a flash memory or a similar element, or a combination of the foregoing elements. The memory 35 records a program code, apparatus configuration, a codebook, buffered or permanent data, and records other various communication protocol-related software modules such as a radio resource control (RRC) layer, a packet data convergence protocol (PDCP) layer, a radio link control (RLC) layer, a media access control (MAC) layer, and a physical layer (PHY), etc.

The processor 36 is coupled to the analog-to-digital/digital-to-analog converter 34 and the memory 35, and the processor 36 is configured to process the digital signal and execute a program according to an exemplary embodiment of the disclosure, and may access or load data and software modules recorded by the memory 35. A function of the processor 36 may be implemented using programmable units such as a central processing unit (CPU), a microprocessor, a microcontroller, a digital signal processing (DSP) chip, and a field programmable logic gate array (FPGA), etc. The function of the processor 36 may also be implemented using an independent electronic apparatus or an integrated circuit (IC), and operations of the processor 36 may also be implemented through software.

The inter-base-station transmission interface 37 is coupled to the processor 36, and the inter-base-station transmission interface 37 may be an Ethernet, a fiber network, or other transmission interfaces. The inter-base-station transmission interface 37 is configured to connect a base station 50 and transmit a message to the base station 50 or receive a message from the base station 50 (that is, communicate with another base station 50). For example, the base station 30 and the base station 50 transmit a message through an X2 or Xn interface (not through a core network 70). It should be noted that different generations of mobile communication standards may have different definitions of the inter-base-station interface, but a name or a type thereof is not limited in the embodiment of the disclosure.

Figure 3:
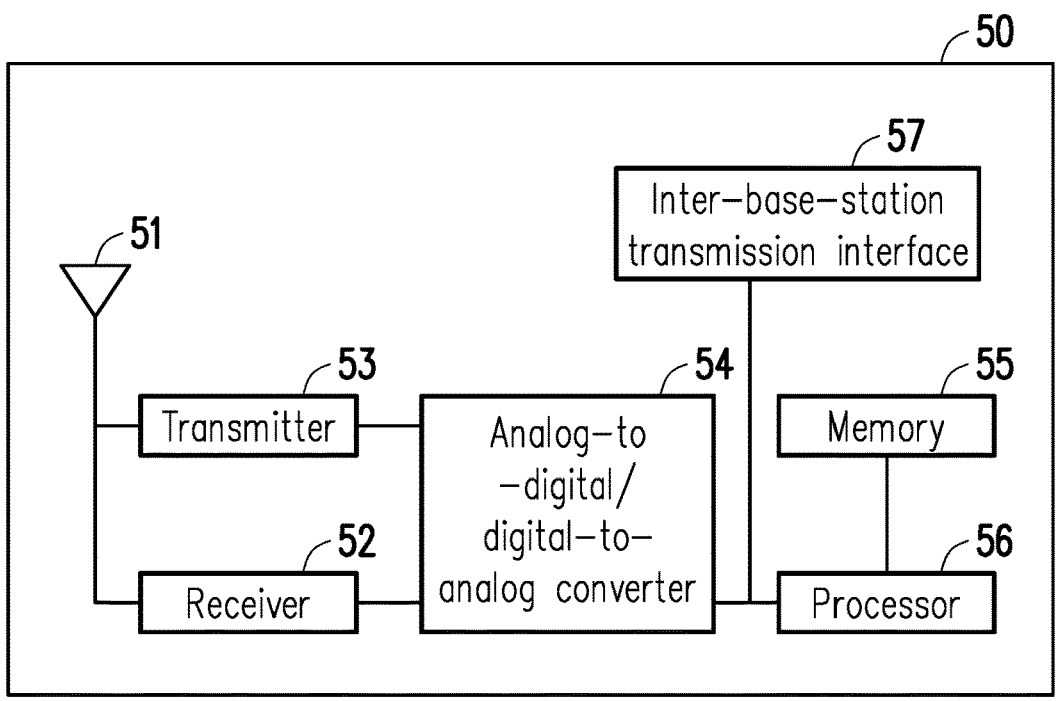
FIG. 3 is a block diagram of elements of another base station according to an embodiment of the disclosure.

FIG. 3 is a block diagram of elements of another base station 50 according to an embodiment of the disclosure. Referring to FIG. 2 and FIG. 3, for an implementation of a base station 50 and specific elements thereof, reference may be made to descriptions (that is, an antenna 51, a receiver 52, a transmitter 53, an analog-to-digital/a digital-to-analog converter 54, a memory 55, a processor 56, and an inter-base-station transmission interface 57 respectively corresponding to the antenna 31, the receiver 32, the transmitter 33, the analog-to-digital/digital-to-analog converter 34, the memory 35, the processor 36, and the inter-base-station transmission interface 37) of the base station 30.

It should be noted that in this embodiment, the user equipment 10 and the base stations 30, 50 support a dual connectivity (DC) function. The base station 30 is used as a master node, and the base station 50 is used as a secondary node. The user equipment 10 may be selectively connected to the base station 30 and the base station 50 at the same time. When the base stations 30, 50 serve the user equipment 10 through the dual connectivity function, control signalling is transmitted between the base station 30 and the user equipment 10, and the data may be transmitted between the base station 30 and the user equipment 10 or between the base station 50 and the user equipment 10.

There may be devices such as a home subscriber server (HSS), a mobility management entity (MME), a serving gateway (S-GW), a packet data network gateway (PDN GW), an authentication server function (AUSF) device, an access and mobility management function (AMF) device, a session management function (SMF) device, and/or a user plane function (UPF) device in the core network 70. It should be noted that types and functions of devices in the core network 70 may vary depending on different generations of mobile communication standards, but are not limited in the embodiment of the disclosure.

It should be noted that in the initial stage of 5G deployment, in order to reduce costs and rapidly develop services, most operators select a non-standalone (NSA) mode. Because the 5G core network requires high costs but is not mature, a 5G base station in the NSA mode usually preferentially accesses a 4G core network (for example, an evolved packet core (EPC) network), an EN-DC architecture is a first choice for introduction of an enhanced mobile broadband (eMBB) service in the early stage of 5G.

Figure 4:
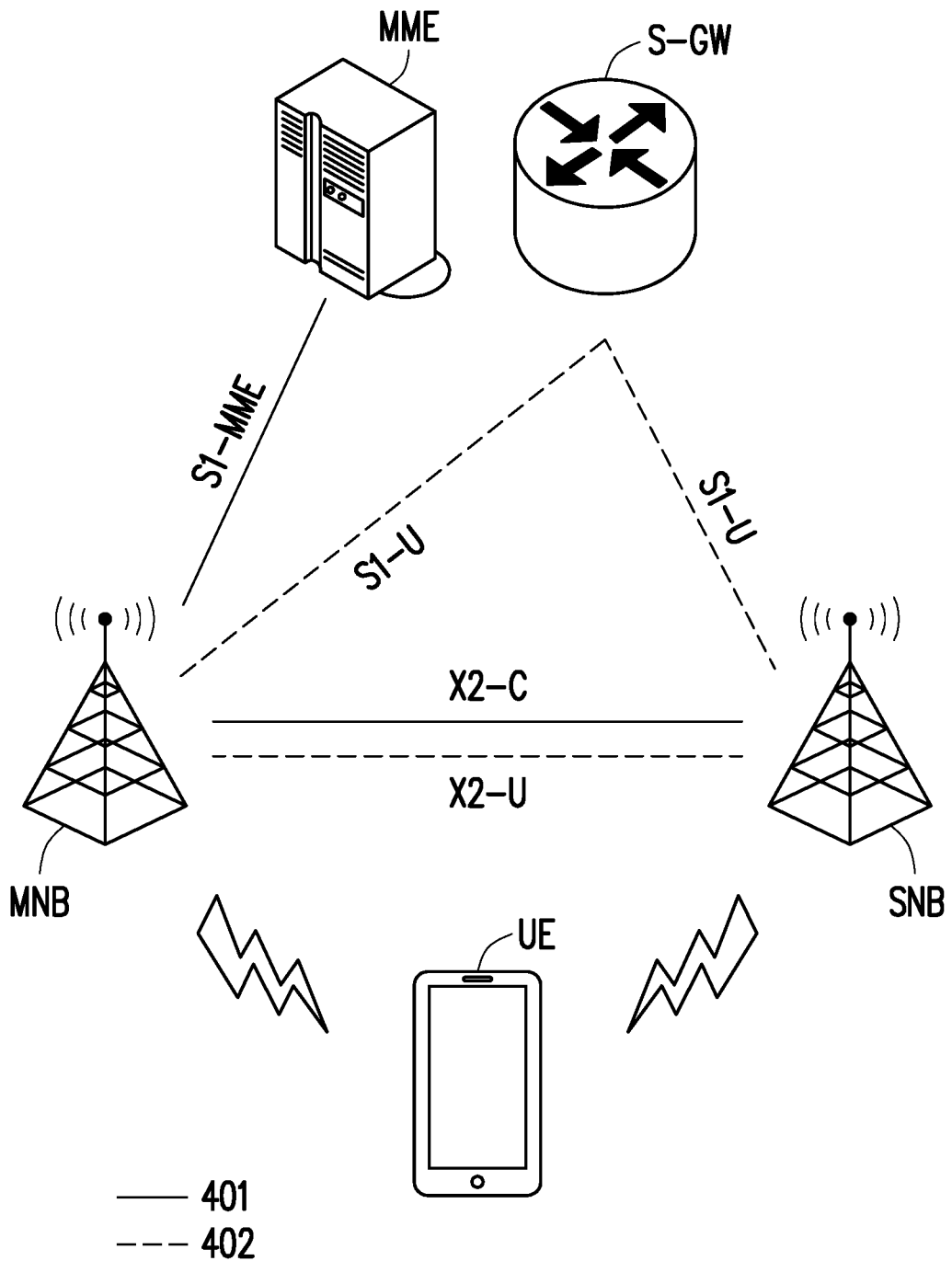
FIG. 4 is a schematic diagram of a communication system of an EN-DC architecture according to an embodiment of the disclosure.

FIG. 4 is a schematic diagram of a communication system of an EN-DC architecture according to an embodiment of the disclosure. Referring to FIG. 4, a connection line 401 represents a control plane (C-Plane) and is configured to transmit control signalling. For example, there is an S1-MME control plane link between a base station (MNB) (e.g., a base station 30) of 4G LTE and a core network (that is, a network in which a mobility management entity (MME) and a serving gateway (S-GW) are located). There is no control plane link for the base station (SNB) (e.g., a base station 50) of 5G NR to be directly connected to the core network. There is an X2-C control plane link between the base station (MNB) and the base station (SNB).

In addition, a connection line 402 represents a user plane (U-Plane) and is configured to transmit user data. For example, there is an X2-U user plane link between the base station (MNB) and the base station (SNB). There is an S1-U user plane link between the core network, and the base station (MNB) and the base station (SNB).

In such a dual connectivity architecture, the user equipment (UE) (e.g., user equipment 10) has two paths, the two paths arriving at the core network respectively via the base station (MNB) or the base station (SNB). Therefore, data transmission paths include three options: first, only selecting a transmission path via the base station (MNB); second, only selecting a transmission path via the base station (SNB); and third, selecting two transmission paths via the base station (MNB) and the base station (SNB) simultaneously.

Generally, as a master node, the base station (MNB) uses several different center frequencies to form a network of multi-layer cells, and these communities may serve as anchor points of the control plane. Therefore, these 4G cells may be collectively referred to as a master cell group (MCG), and a wireless data bearer established thereon is referred to as a MCG bearer (corresponding to the selection of a transmission path only via the base station (MNB)). Correspondingly, a plurality of 5G cells form a secondary cell group (SCG), and a wireless data bearer established thereon is referred to as an SCG bearer (corresponding to the selection of a transmission path via the base station (SNB)).

With respect to the selection of two transmission paths via the base station (MNB) and the base station (SNB) simultaneously, MCG and SCG are required to cooperate, and packet data is split into two bearers, so a wireless data bearer established thereon is referred to as a split bearer. Split and the convergence of the split bearer may be processed by the PDCP layer (for example, in the charge of processors 36, 56). The selection is mainly used for a case that the bearer of the MCG is insufficient to meet load requirements of the user equipment (UE), and can improve a transmission speed of the user equipment.

However, the split bearer technology has the following problems: when a dual-connection network is applied, the user equipment (UE) needs to enable and monitor data transmission and reception of two wireless modules (for example, which correspond to 4G and 5G networks) so power consumption is relatively high. If the split bearer has an inappropriate data distribution ratio for the two base stations (MNB and SNB) at a split end, and data loss may be caused because data packets are not processed timely for being out of order when being converged at a convergence end.

For the foregoing problem, the embodiment of the disclosure proposes (1) activation of a split bearer transmission mechanism, (2) dynamic adjustment of a data distribution ratio of the master base station and the secondary base station to the split bearer, and (3) deactivation of the split bearer transmission mechanism. Accordingly, the base stations 30, 50 perform the split bearer transmission mechanism only at the right moment, and the user equipment 10 is not required to enable and monitor data transmission and reception of the two wireless modules all the time. In addition, when the split bearer is needed, the base stations 30, 50 can dynamically adjust the data distribution ratio, so that no data loss is caused when data is converged at the convergence end.

In order to facilitate understanding of the operation process of the embodiment of the disclosure, the operation process of a communication system 1 in the embodiment of the disclosure will be described in detail below using a plurality of embodiments. In the following, the method in the embodiment of the disclosure will be described in combination with apparatuses and elements thereof in the communication system 1. Each process of the method according to the embodiment of the disclosure may be adjusted according to an implementation situation, and is not limited thereto. In addition, for convenience of illustration, the processor 36 of the base station 30 is used as an example and used as an operating body in the following. However, some operations on the processor 36 may also be performed through the processor 56 of the base station 50 by a receiver that receives a message (that is related to data packets corresponding to a data bearer transmitted to the user equipment 10) from the core network 70.

Figure 5:
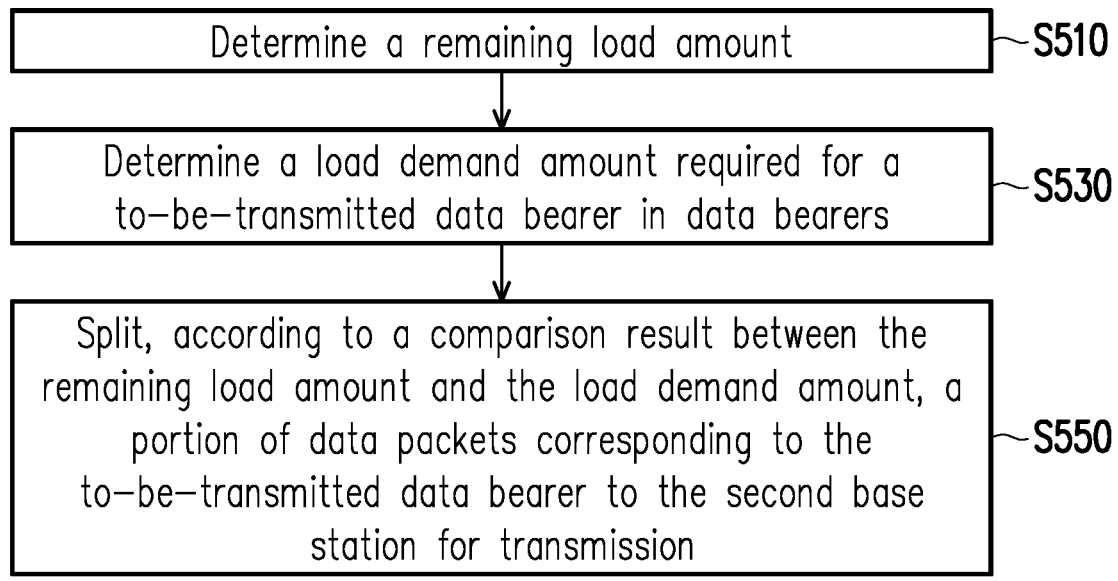
FIG. 5 is a flowchart of an adjustment method for data transmission according to an embodiment of the disclosure.

FIG. 5 is a flowchart of an adjustment method for data transmission according to an embodiment of the disclosure. Referring to FIG. 5, a processor 36 determines a remaining load amount (step S510). In particular, the remaining load amount is a residual capacity used by the base station 30 for one or more data bearers to store data packets thereof. For example, for each data bearer, the PDCP layer provides a reception buffer to store a PDCP service data unit (SDU) or other types of data units (for mixing data packets), the reception buffer being provided with a predetermined or variable buffer size. The remaining load amount is, for example, a difference value between the buffer size and sizes of those cached data units. The processor 36 updates the sizes of those cached data units at any time based on successfully transmitted data units. It should be noted that the remaining load amount is calculated based on data volume calculation proposed by 3GPP TS 38.323 or in other calculation manners.

The processor 36 determines a load demand amount required for a to-be-transmitted data bearer in data bearers (step S530). In particular, the load demand amount is a capacity required for several data packets corresponding to the to-be-transmitted data bearer. In response to a transmission requirement of user equipment 10 for a to-be-transmitted data bearer has, the processor 36 determines that the to-be-transmitted data bearer corresponds to a reception buffer, and obtains, through the reception buffer, a size or a volume of the data packet required to be transmitted by the to-be-transmitted data bearer.

Next, the processor 36 determines, according to a comparison result between the remaining load amount and the load demand amount, that a portion of the data packets corresponding to the to-be-transmitted data bearer is split to a base station 50 for transmission (step S550). In particular, the processor 36 determines whether the remaining load amount is sufficient for transmission of load demand amounts required for the to-be-transmitted data bearer. If yes, it indicates that the base station 30 is completely capable of bearing the load demand amount. In other words, the load demand amount may be satisfied through the foregoing selection of the transmission path only via one base station. If no, the base station 30 may seek other base stations to share the load demand amount. In other words, the load demand amount may be satisfied through the foregoing selection of the two transmission paths via two base stations. The technology of splitting data packets in the embodiment of the disclosure is, for example, a split bearer defined based on 3GPP or other path transmission technologies of distributing data packets of a single data bearer to more than two base stations.

Figure 6:
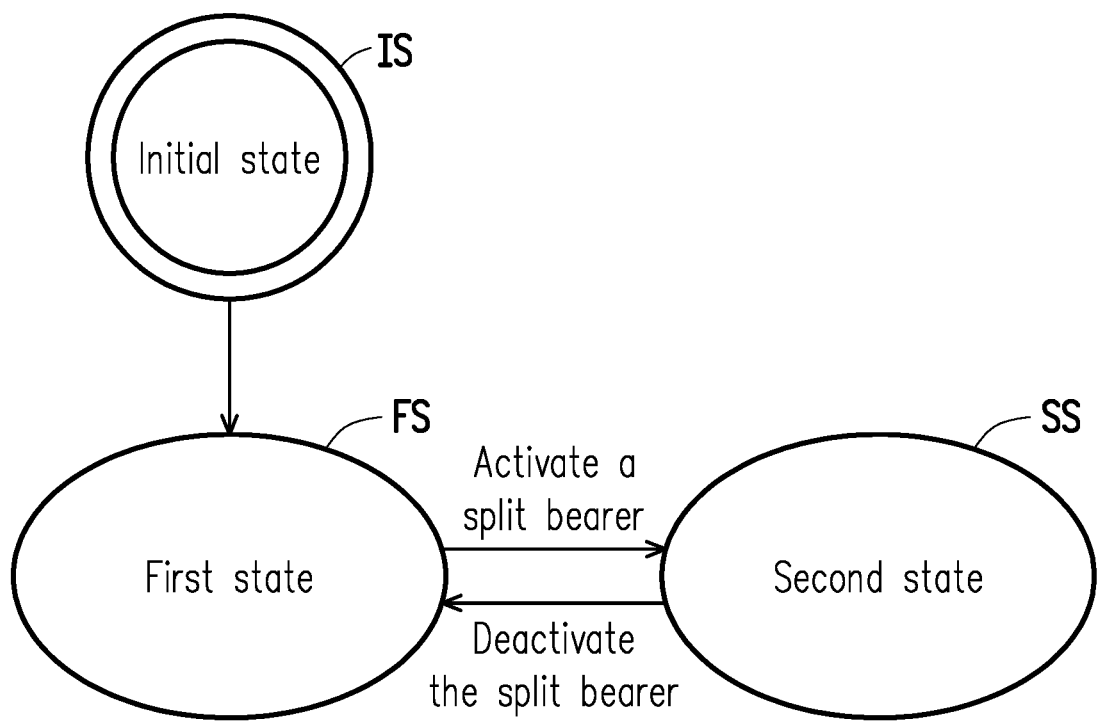
FIG. 6 is a diagram of states of a base station according to an embodiment of the disclosure.

FIG. 6 is a diagram of states of base stations 30, 50 according to an embodiment of the disclosure. Referring to FIG. 6, the base stations 30, 50 respectively operate state machines of split bearer mechanisms thereof. The state machine includes an initial state (IS), a first state (FS), and a second state (SS). The base stations 30, 50 are in the initial state (IS) after being enabled, and enter the first state (FS) in response to a requirement of a to-be-transmitted data bearer for data transmission. The first state (FS) is related to use of a non-split bearer (that is, deactivating or disabling the split bearer mechanism), and the second state (SS) is related to use of the split bearer (that is, activating the split bearer mechanism). Next, the base stations 30, 50 determine, based on a comparison result between the remaining load amount and the load demand amount, whether the first state (FS) is maintained or the first state is handed over to the second state (SS).

Operation processes of two states (FS and SS) are described in detail below.

Figure 7:
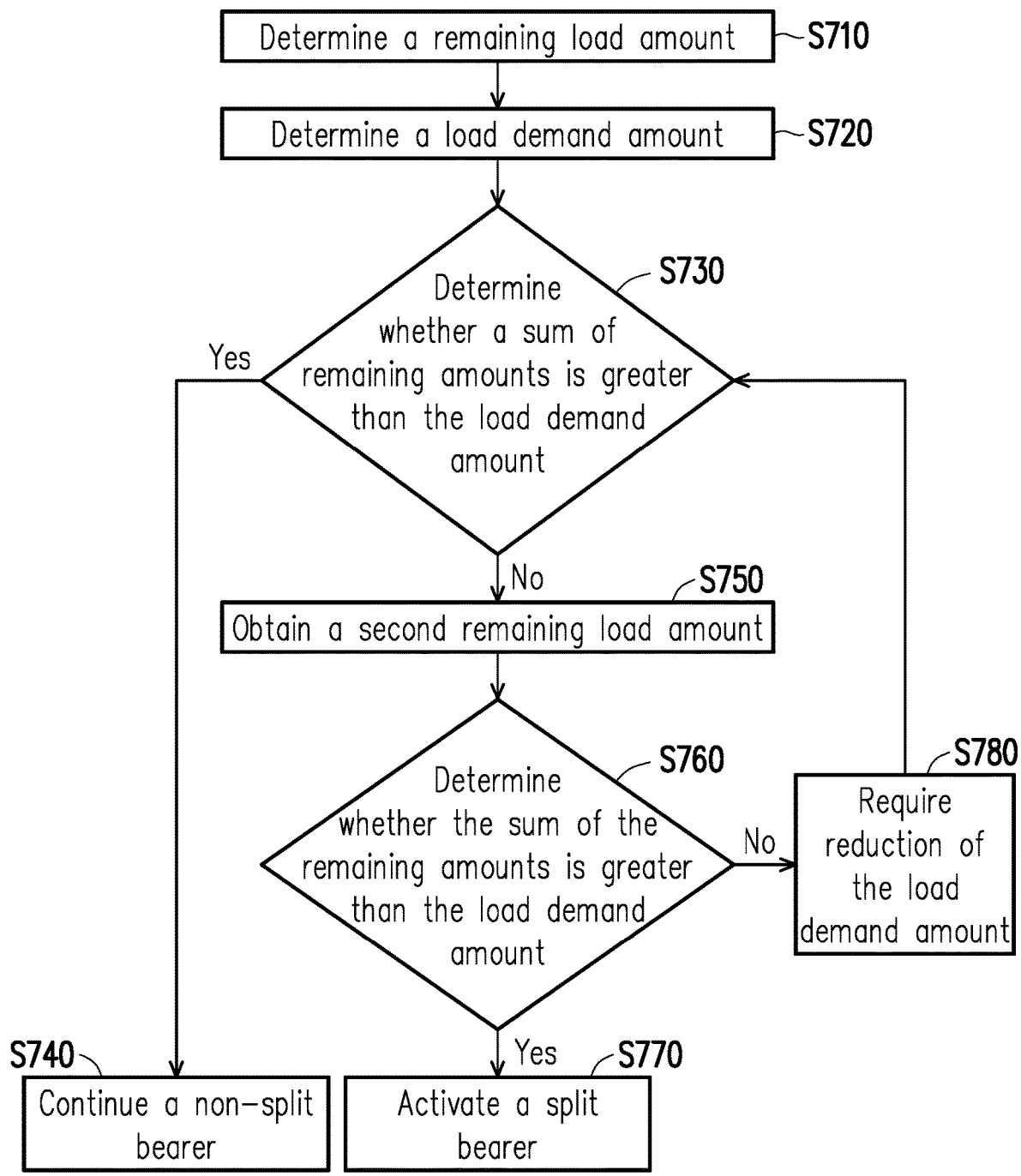
FIG. 7 is a flowchart of an adjustment method for a first state according to an embodiment of the disclosure.

FIG. 7 is a flowchart of an adjustment method for a first state (FS) according to an embodiment of the disclosure. Referring to FIG. 7, for introduction of step S710 and step S720, reference may be made to the foregoing descriptions of step S510 and step S530, and the descriptions thereof are omitted herein. Next, the processor 36 determines that the remaining load amount is greater than a load demand amount of the to-be-transmitted data bearer (step S730). If the comparison result is that the remaining load amount is greater than the load demand amount, the processor 36 transmits the data packets corresponding to the to-be-transmitted data bearer only via either of the base station 50 or the base station 30 (possibly based on attribution of an MCG (corresponding to the base station 30) and an SCG (corresponding to the base station 50) (step S740, that is, the first state (FS) of the non-split bearer continues to be used).

Alternatively, if the comparison result is that the remaining load amount is not greater than the load demand amount, the processor 36 obtains a second remaining load amount of the base station 50 through an inter-base-station transmission interface 37 (step S750). The remaining load amount is a residual capacity used by the base station 50 for one or more data bearers to store data packets. A calculation method of the second remaining load amount may be based on the foregoing description of the remaining load amount, and the descriptions thereof are omitted herein. The second remaining load amount may be transmitted, for example, through data delivery status defined by 3GPP TS 36.425 or other messages about capacity information that may be buffered by a data packet of the to-be-transmitted data bearer.

Next, the processor 36 determines, according to a second comparison result between a sum of the remaining amounts and the load demand amount, that a portion of the data packets corresponding to the to-be-transmitted data bearer is split to the base station 50 for transmission. The sum of remaining amounts is a sum of the remaining load amounts of the base station 30 and the second remaining load amount of the base station 50. The processor 36 may determine whether the sum of the remaining amounts is greater than the load demand amount (step S760). If the second comparison result is that the sum of the remaining amounts is greater than the load demand amount, the processor 36 allows the portion of the data packets corresponding to the to-be-transmitted data bearer to be split to the base station 50 for transmission (step S770, that is, activating the split bearer and handing over the bearer to the second state (SS). If the second comparison result is that the sum of the remaining amounts is not greater than the load demand amount, the processor 36 sends control signalling through a transmitter 33, the control signalling requiring the user equipment 10 to reduce the load demand amount of the to-be-transmitted data bearer (step S780), and determines whether the updated load demand amount is sufficient for bearing the remaining load amount (return to step S840). For example, the control signalling is related to change of a type of the to-be-transmitted data bearer, or a compressed encoding type of data packets, etc.

Figure 8:
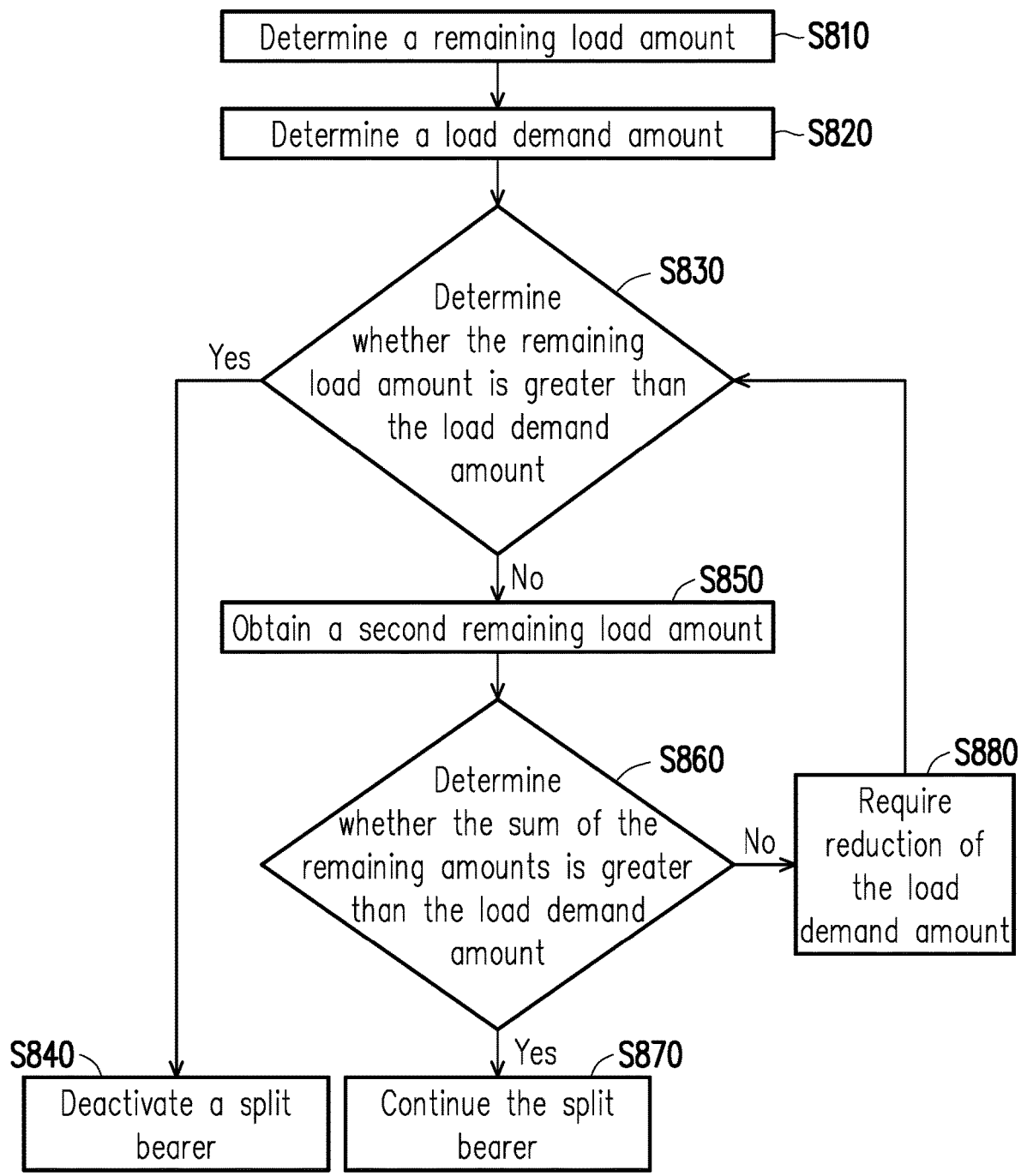
FIG. 8 is a flowchart of an adjustment method for a second state according to an embodiment of the disclosure.

FIG. 8 is a flowchart of an adjustment method for a second state SS according to an embodiment of the disclosure. Referring to FIG. 8, for descriptions of steps S810-S830, S850-S860, and S880, reference may be respectively made to the foregoing descriptions of steps S710-S730, S750-S760, and S780, and the descriptions thereof are omitted herein. A difference from the first state (FS) is that, the processor 36 deactivates the split bearer (step S840, that is, handing over to the first state (FS) using a non-split bearer) if the comparison result is that the remaining load amount is greater than the load demand amount. In addition, if the second comparison result is that the sum of the remaining amounts is greater than the load demand amount, the processor 36 continues using the split bearer (step S870, that is, maintaining in the second state (SS).

It can be learnt that, in the embodiment of the disclosure, the state is dynamically handed over based on a comparison result between a remaining load amount of the base station 30 and/or the base station 50 and the load demand amount. As long as the remaining load amount of a single base station 30 or 50 is sufficient for bearing (greater than) the load demand amount, the user equipment 10 only needs to perform data transmission through a single communication module, thereby saving electric power.

It should be noted that in other embodiments, the processor 36 may also directly activate the split bearer mechanism without regard to a second remaining load amount in response to a comparison result that the remaining load amount is not greater than the load demand amount.

Figure 9:
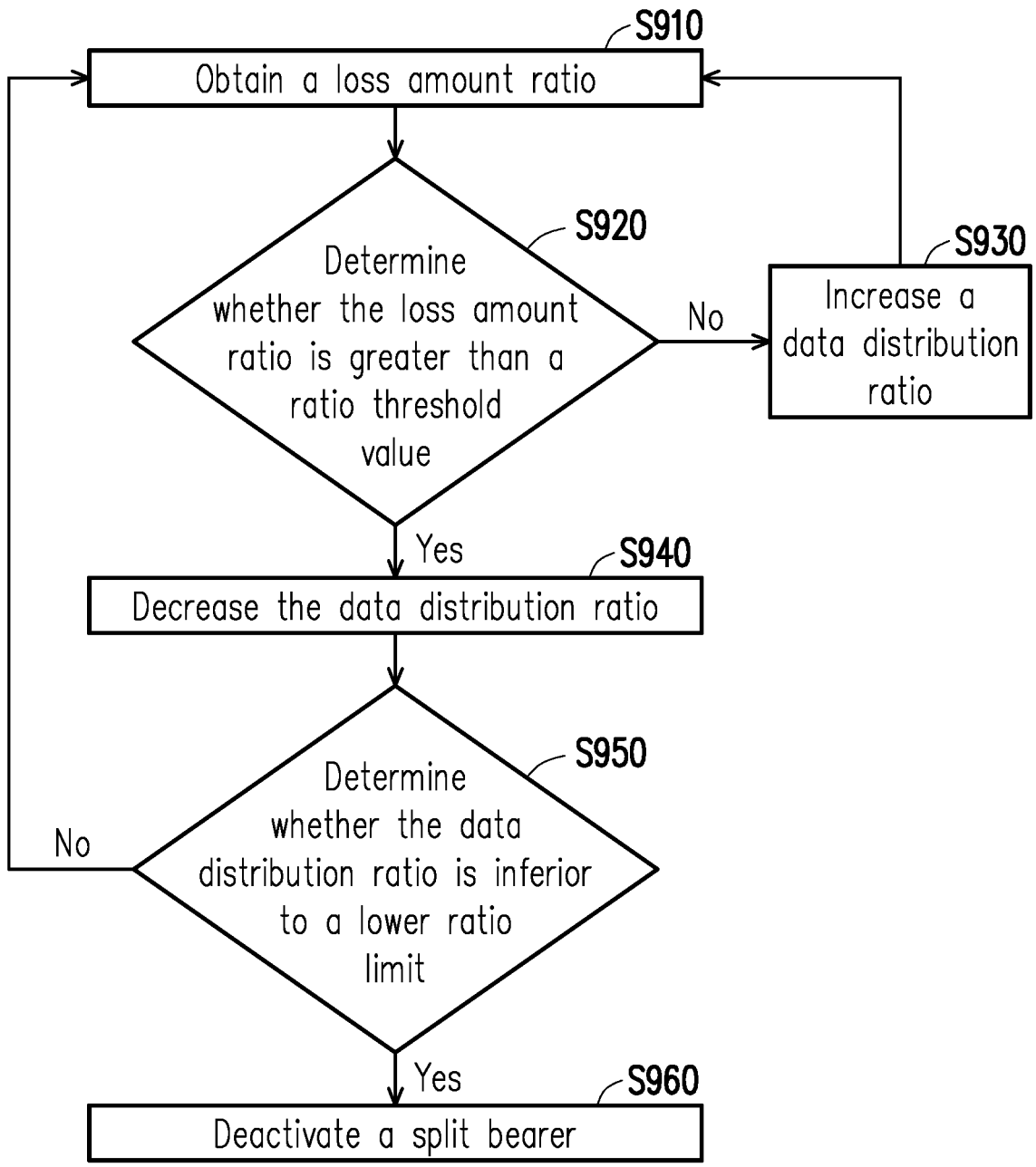
FIG. 9 is a flowchart of a ratio adjustment method according to an embodiment of the disclosure.

In addition, in the second state (SS), in the embodiment of the disclosure, a data attribution ratio of the two base stations 30, 50 corresponding to the split bearer may also dynamically adjusted. FIG. 9 is a flowchart of a ratio adjustment method according to an embodiment of the disclosure. Referring to FIG. 9, if a processor 36 determines that a portion of data packets corresponding to a to-be-transmitted data bearer is split to a base station 50 for transmission (that is, maintaining the state or handing over to a second state SS)), the processor 36 may obtain, through the inter-base-station transmission interface 37, a loss amount ratio of the base station 50 to the data packets corresponding to the to-be-transmitted data bearer. For example, a data transmission status message defined by 3GPP TS 36.425 records related information of a successfully and/or unsuccessfully delivered data unit. The processor 36 may calculate, based on the information, a loss amount ratio (a result of a sum of unsuccessfully delivered data units divided by an amount of data packets distributed to the base station 50) of data packets of the to-be-transmitted data bearer transmitted by another base station 50. If the loss amount ratio is inferior to a ratio threshold value (e.g., 10%, 25%, or 40%), it indicates that a probability of successful transmission through another base station 50 is relatively higher, and the processor 36 may increase the distribution ratio of data distributed to the base station 50 (step S930) (the distribution ratio of data distributed to the base station 30 may be correspondingly reduced). The data distribution ratio is related to a ratio of the data packets split to another base station 50 to those data packets. The processor 36 may increase the data distribution ratio by a specified value, or change an increased value based on other dynamic parameters (e.g., the loss amount ratio or channel quality, etc.). Alternatively, if the loss amount ratio is not inferior to the ratio threshold value, it indicates that the probability of successful transmission through the another base station 50 is relatively low, and the processor 36 may reduce the data distribution ratio (the distribution ratio of data distributed to the base station 30 may be relatively increased) of the base station 50. Similarly, the processor 36 may also decrease the data distribution ratio by a specified value, or change the decreased value based on other dynamic parameters (e.g., the loss amount ratio or channel quality, etc.).

In addition, after the data distribution ratio is reduced, the processor 36 further determines whether the data distribution ratio is inferior to a lower ratio limit (for example, 10%, 5%, or 3%) (step S950). If the data distribution ratio is inferior to the lower ratio limit, it indicates that a probability of transmission failure through the other base station 50 is relatively high, and the processor 36 transmits those data packets corresponding to the to-be-transmitted data bearer only via the base station 30, and accordingly deactivates the split bearer mechanism (step S960, that is, handing over to the first state (SS)). Alternatively, if the data distribution ratio is not inferior to the lower ratio limit, the processor 36 continues updating the loss amount ratio (return to step S910).

It can be learnt that in the embodiment of the disclosure, the data distribution ratio of the two base stations are dynamically handed over and adjusted based on the loss amount of data transmitted by another base station. As long as the loss amount of the another base station 50 is relatively large, the data distribution ratio corresponding to the base station 30 is increased, so that a probability of successful transmission of data packets is enhanced.

It should be noted that in other embodiments, the processor 36 may also increase a data distribution ratio corresponding to the another base station 50 in response to the excessively high loss amount (compared to the ratio threshold value) thereof. Alternatively, the processor 36 adjusts the data distribution ratio based on conditions such as the channel quality and signal strength, etc. reported by the user equipment 10, and increases a data distribution ratio corresponding to a path with a higher probability of successful transmission.

In summary, according to the base station and the adjustment method for data transmission in the embodiments of the disclosure, data traffic loading (that is, the load demand amount) of the user equipment, data traffic loading (that is, the remaining load amount) of the base station, and channel quality (related to the loss amount ratio) of the two base stations are considered, and thus the split bearer mechanism is dynamically activated or deactivated, and the data distribution ratio of the split bearer is adjusted. Accordingly, the user equipment does not need to monitor data reception and transmission of the two base stations simultaneously all the time, and there is still time to converge the data at the convergence end.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. An adjustment method for data transmission adapted for a first base station, and user equipment being selectively connected to the first base station and a second base station at the same time, the adjustment method for data transmission comprising:
   determining a remaining load amount, wherein the remaining load amount is a residual capacity used for at least one data bearer to store at least one data packet;
   determining a load demand amount required for a to-be-transmitted data bearer in the at least one data bearer, wherein the load demand amount is a storage capacity required for an amount of a plurality of data packets corresponding to the to-be-transmitted data bearer; and
   determining, according to a comparison result between the remaining load amount and the load demand amount, that a portion of the data packets corresponding to the to-be-transmitted data bearer is split to the second base station for transmission, comprising:
      in response to the comparison result that the remaining load amount is not greater than the load demand amount, obtaining a second remaining load amount of the second base station, wherein the remaining load amount is a residual capacity used by the second base station for the at least one data bearer to store the at least one data packet; and
      determining, according to a second comparison result between a sum of remaining amounts and the load demand amount, that the portion of the data packets corresponding to the to-be-transmitted data bearer is split to the second base station for transmission, wherein the sum of the remaining amounts is a sum of the remaining load amount and the second remaining load amount.

2. The adjustment method for data transmission according to claim 1, wherein determining, according to the comparison result, that the portion of the data packets corresponding to the to-be-transmitted data bearer is split to the second base station for transmission comprises:
   in response to the comparison result that the remaining load amount is not greater than the load demand amount, splitting the portion of the data packets corresponding to the to-be-transmitted data bearer to the second base station for transmission; or
   in response to the comparison result that the remaining load amount is greater than the load demand amount, transmitting, only by either of the second base station or the first base station, the data packets corresponding to the to-be-transmitted data bearer.

3. The adjustment method for data transmission according to claim 1, wherein determining, according to the second comparison result, that the portion of the data packets corresponding to the to-be-transmitted data bearer is split to the second base station for transmission comprises:
   in response to the second comparison result that the sum of the remaining amounts is not greater than the load demand amount, requiring reduction of the load demand amount; or
   in response to the second comparison result that the sum of the remaining amounts is greater than the load demand amount, allowing splitting the portion of the data packets corresponding to the to-be-transmitted data bearer to the second base station for transmission.

4. The adjustment method for data transmission according to claim 1, wherein determining, according to the comparison result, that the portion of the data packets corresponding to the to-be-transmitted data bearer is split to the second base station for transmission comprises:
   in response to the determining that the portion of the data packets corresponding to the to-be-transmitted data bearer is split to the second base station for transmission, obtaining a loss amount ratio of the second base station to the data packets corresponding to the to-be-transmitted data bearer; and
   in response to the loss amount ratio being inferior to a ratio threshold value, increasing a data distribution ratio of the second base station, wherein the data distribution ratio is related to a ratio of the data packets that are split to the second base station to the data packets; or in response to the loss amount ratio being not inferior to the ratio threshold value, reducing the data distribution ratio of the second base station.

5. The adjustment method for data transmission according to claim 4, wherein reducing the data distribution ratio of the second base station comprises:

in response to the data distribution ratio being inferior to a lower ratio limit, transmitting, only by the first base station, the data packets corresponding to the to-be-transmitted data bearer.

6. A base station, wherein user equipment is selectively connected to the base station and a second base station at the same time, the base station comprising:

an inter-base-station transmission interface configured to communicate with the second base station; and a processor coupled to the inter-base-station transmission interface and configured to perform:

determining a remaining load amount, wherein the remaining load amount is a residual capacity used for at least one data bearer to store at least one data packet;

determining a load demand amount required for a to-be-transmitted data bearer in the at least one data bearer, wherein the load demand amount is a storage capacity required for an amount of a plurality of data packets corresponding to the to-be-transmitted data bearer; and determining, according to a comparison result between the remaining load amount and the load demand amount, that a portion of the data packets corresponding to the to-be-transmitted data bearer is split to the second base station for transmission through the inter-base-station transmission interface, wherein the processor is further configured to perform:

in response to the comparison result that the remaining load amount is not greater than the load demand amount, obtaining a second remaining load amount of the second base station through the inter-base-station transmission interface, wherein the remaining load amount is a residual capacity used by the second base station for the at least one data bearer to store the at least one data packet; and determining, according to a second comparison result between a sum of remaining amounts and the load demand amount, that the portion of the data packets corresponding to the to-be-transmitted data bearer is split to the second base station for transmission through the inter-base-station transmission interface, wherein the sum of the remaining amounts is a sum of the remaining load amount and the second remaining load amount.

7. The base station according to claim 6, wherein the processor is configured to perform:

in response to the comparison result that the remaining load amount is not greater than the load demand amount, splitting, through the inter-base-station transmission interface, the portion of the data packets corresponding to the to-be-transmitted data bearer to the second base station for transmission; or in response to the comparison result that the remaining load amount is greater than the load demand amount, transmitting, only by either of the second base station or the base station, the data packets corresponding to the to-be-transmitted data bearer.

8. The base station according to claim 6, wherein the processor is configured to perform:

in response to the second comparison result that the sum of the remaining amounts is not greater than the load demand amount, requiring reduction of the load demand amount; or in response to the second comparison result that the sum of the remaining amounts is greater than the load demand amount, allowing splitting the portion of the data packets corresponding to the to-be-transmitted data bearer to the second base station for transmission through the inter-base-station transmission interface.

9. The base station according to claim 6, wherein the processor is configured to perform:

in response to the determining that the portion of the data packets corresponding to the to-be-transmitted data bearer is split to the second base station for transmission, obtaining, through the inter-base-station transmission interface, a loss amount ratio of the second base station to the data packets corresponding to the to-be-transmitted data bearer; and in response to the loss amount ratio being inferior to a ratio threshold value, increasing a data distribution ratio of the second base station, wherein the data distribution ratio is related to a ratio of the data packets that are split to the second base station to the data packets; or in response to the loss amount ratio being not inferior to the ratio threshold value, reducing the data distribution ratio of the second base station.

10. The base station according to claim 9, wherein the processor is configured to perform:

in response to the data distribution ratio being inferior to a lower ratio limit, transmitting, only by the base station, the data packets corresponding to the to-be-transmitted data bearer.

* * * * *